United States Patent
Lee et al.

(10) Patent No.: US 12,489,543 B2
(45) Date of Patent: Dec. 2, 2025

(54) OPERATING METHOD OF ELECTRONIC APPARATUS FOR TRANSMITTING SIGNAL AND ELECTRONIC APPARATUS SUPPORTING THE SAME

(71) Applicant: AGENCY FOR DEFENSE DEVELOPMENT, Daejeon (KR)

(72) Inventors: Ju Hyung Lee, Daejeon (KR); Chul Hee Choi, Daejeon (KR); Byung Seok Woo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 503 days.

(21) Appl. No.: 18/122,966

(22) Filed: Mar. 17, 2023

(65) Prior Publication Data
US 2023/0299868 A1    Sep. 21, 2023

(30) Foreign Application Priority Data
Mar. 21, 2022    (KR) .................. 10-2022-0034797

(51) Int. Cl.
*H04K 1/04* (2006.01)
*H04K 1/00* (2006.01)

(52) U.S. Cl.
CPC ............... *H04K 1/04* (2013.01); *H04K 1/006* (2013.01)

(58) Field of Classification Search
CPC ................. H04K 1/04; H04K 1/006
See application file for complete search history.

(56) References Cited

U.S. PATENT DOCUMENTS

| | | | | |
|---|---|---|---|---|
| 2,890,269 A | * | 6/1959 | Druz | H04K 1/006 |
| | | | | 380/236 |
| 10,439,754 B2 | * | 10/2019 | Jeng | H04K 1/04 |
| 2005/0031051 A1 | * | 2/2005 | Rosen | H04B 1/713 |
| | | | | 375/147 |
| 2010/0054482 A1 | | 3/2010 | Johnston | |
| 2020/0304359 A1 | | 9/2020 | Li et al. | |

FOREIGN PATENT DOCUMENTS

| | | |
|---|---|---|
| JP | 2006333138 A | 12/2006 |
| KR | 10-0780017 | 11/2007 |
| KR | 2011-0063807 A | 6/2011 |
| KR | 10-1837265 | 4/2018 |
| KR | 10-1872738 B1 | 8/2018 |
| KR | 10-2224645 B1 | 3/2021 |

OTHER PUBLICATIONS

Office Action issued on Nov. 29, 2023 in corresponding Korean Application No. 10-2022-0034797.

\* cited by examiner

*Primary Examiner* — David Bilodeau
(74) *Attorney, Agent, or Firm* — MILES & STOCKBRIDGE P.C.

(57) ABSTRACT

Systems, devices, methods, and instructions for transmitting a signal by an electronic apparatus that include generating transmission data and pseudo-random data corresponding to the transmission data, setting a first pseudo time delay interval for the transmission data and a second pseudo time delay interval for the pseudo-random data, acquiring a data signal for transmitting the transmission data to correspond to the first pseudo time delay interval and a pseudo-random signal for transmitting the pseudo-random data to correspond to the second pseudo time delay interval, and transmitting an overlapping signal including the data signal and the pseudo-random signal.

20 Claims, 9 Drawing Sheets

OPERATING METHOD OF ELECTRONIC APPARATUS FOR TRANSMITTING SIGNAL AND ELECTRONIC APPARATUS SUPPORTING THE SAME

PRIORITY INFORMATION

This application claims the benefit of Korean Patent Application No. 10-2022-0034797, filed on Mar. 21, 2022, in the Korean Intellectual Property Office, the disclosure of which is incorporated herein by reference in its entirety.

FIELD OF INVENTION

Example embodiments of the present disclosure generally relate to transmitting a signal, and more particularly, to systems, devices, methods and instructions for transmitting a data signal and a pseudo-random signal in consideration of a pseudo time delay interval in which a signal is not to be transmitted and an electronic apparatus thereof.

DESCRIPTION OF THE RELATED ART

Various security techniques are being applied to prevent eavesdropping and interception of communication signals from external sources, and in military communications where stronger security is required, various physical layer security techniques are being developed to make it difficult for the enemy to intercept friendly communication signals.

The fundamental concept of physical layer security techniques is to degrade the quality of signals received to the enemy's eavesdropping and interception equipment while maintaining the quality of signals received to friendly communication equipment to make it difficult for the enemy to receive friendly signals.

In this regard, prior art documents such as KR101837265B1 can be referenced and, in the present disclosure, effective eavesdropping prevention may be achieved by inserting a time delay for a data signal and a pseudo-random signal.

SUMMARY OF THE INVENTION

Accordingly, the present invention is directed to systems, devices, methods, and instructions for transmitting a signal that substantially obviate one or more problems due to limitations and disadvantages of the related art.

According to a method of the present disclosure, an electronic apparatus may transmit a data signal and a pseudo-random signal in consideration of a pseudo time delay interval in which a signal is not to be transmitted.

Technical goals of the present disclosure are not limited to the aforementioned technical features, and other unstated technical goals may be inferred from example embodiments below.

According to various example embodiments, there is provided an operation method of an electronic apparatus for transmitting a signal and an electronic apparatus supporting the same.

According to various example embodiments, there is provided a method of transmitting a signal by an electronic apparatus, the method including generating transmission data and pseudo-random data corresponding to the transmission data, setting a first pseudo time delay interval for the transmission data and a second pseudo time delay interval for the pseudo-random data, acquiring a data signal for transmitting the transmission data to correspond to the first pseudo time delay interval and a pseudo-random signal for transmitting the pseudo-random data to correspond to the second pseudo time delay interval, and transmitting an overlapping signal including the data signal and the pseudo-random signal.

The first pseudo time delay interval may include one or more time intervals in which the transmission data is not to be transmitted in a signal transmission time interval for transmitting the overlapping signal, and the second pseudo time delay interval may include one or more time intervals in which the pseudo-random data is not to be transmitted in the signal transmission time interval.

The data signal may be transmitted based on a remaining time interval other than the first pseudo time delay interval in the signal transmission time interval, the pseudo-random signal may be transmitted based on a remaining time interval other than the second pseudo time delay interval in the signal transmission time interval, and the data signal and the pseudo-random signal may overlap in the signal transmission time interval.

The setting of the first pseudo time delay interval and the second pseudo time delay interval may include acquiring first information including information on the first pseudo time delay interval and second information including information on the second pseudo time delay interval, and setting the first pseudo time delay interval and the second pseudo time delay interval based on the first information and the second information.

The first information may include one or more pieces of indication information including a symbol and an offset for indicating one or more time intervals included in the first pseudo time delay interval, and the one or more pieces of indication information may include first indication information including a first symbol and a first offset for indicating a first time interval included in the one or more time intervals.

The second information may include one or more pieces of indication information including a symbol and an offset for indicating one or more time intervals included in the second pseudo time delay interval, and the one or more pieces of indication information may include second indication information including a second symbol and a second offset for indicating a second time interval included in the one or more time intervals.

The first information may be configured to correspond to the transmission data, the second information may be configured to correspond to the pseudo-random data, and the first information and the second information may be configured to correspond to the electronic apparatus.

The first pseudo time delay interval and the second pseudo time delay interval may be updated and set in cycles of a frame including the signal transmission time interval for transmitting the overlapping signal.

According to various example embodiments, there is provided a non-transitory computer-readable storage medium including a computer program to execute a signal transmission method, wherein the signal transmission method includes generating transmission data and pseudo-random data corresponding to the transmission data, setting a first pseudo time delay interval for the transmission data and a second pseudo time delay interval for the pseudo-random data, acquiring a data signal for transmitting the transmission data to correspond to the first pseudo time delay interval and a pseudo-random signal for transmitting the pseudo-random data to correspond to the second pseudo time delay interval, and transmitting an overlapping signal including the data signal and the pseudo-random signal.

According to various example embodiments, there is provided an electronic apparatus for transmitting a signal, the electronic apparatus including a processor and one or more memories in which one or more instructions are stored, wherein when executed, the one or more instructions control the processor to perform generating transmission data and pseudo-random data corresponding to the transmission data, setting a first pseudo time delay interval for the transmission data and a second pseudo time delay interval for the pseudo-random data, acquiring a data signal for transmitting the transmission data to correspond to the first pseudo time delay interval and a pseudo-random signal for transmitting the pseudo-random data to correspond to the second pseudo time delay interval, and transmitting an overlapping signal including the data signal and the pseudo-random signal.

The example embodiments of the present disclosure described above are merely some of example embodiments of the present disclosure. It will be understood by those skilled in the art that various example embodiments in which technical features of the various example embodiments of the present disclosure are reflected may be derived based on the following detailed description.

According to the present disclosure, it is possible to provide a method of transmitting a data signal and a pseudo-random signal by an electronic apparatus in consideration of a pseudo-time delay interval in which a signal is not to be transmitted, thereby preventing eavesdropping on an overlapping signal of a pseudo-random signal and a data signal having a pseudo time delay.

Effects of the present disclosure are not limited to the above-mentioned effects, and effects other than the above-mentioned effects can be clearly understood by those of ordinary skill in the art from the following descriptions.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The following example embodiments are obtained by combining constituent elements and features of various example embodiments in a predetermined form. Each constituent element or feature may be considered optional, unless clearly other stated. Each constituent element or feature may be defined in a form that is not coupled with another constituent element or feature. In addition, some constituent elements and features may be combined with each other to implement various example embodiments. The order of operations which will be described in various example embodiments may be changed. Some constituent elements or features of any of the example embodiments may be included in other example embodiments, or may be replaced with corresponding those of other example embodiments.

In the description of the drawings, procedures or steps that may obscure the gist of various example embodiments, and the like have not been described, and procedures or steps that may be understood by those skilled in the art have also not been described.

When a part "comprises or includes" a constituent element through the specification, this means that the part may further include other constituent elements, rather than excluding other constituent elements, unless other stated. In addition, the terms such as "part," "-er,-or," "module" and the like used herein may refer to a unit that performs at least one function or operation, which may be realized as hardware or software, or may be realized as a combination of hardware and software. Further, the word "a or an," "one," "the" and similar words may be used to include the singular form or the plural form, unless the contents (specifically, the contents in the claims) describing various example embodiments clearly dictates otherwise.

Various example embodiments of the present disclosure will be described in detail below with reference to the accompanying drawings. The detailed description to be disclosed below in conjunction with the accompanying drawings is intended to describe examples of various example embodiments and is not limited thereto.

Furthermore, terms used in various example embodiments are provided to facilitate overall understanding of various example embodiments, and the use of such specific terms may be changed to other terms without departing from the technical ideas of the various example embodiments.

Figure 1:
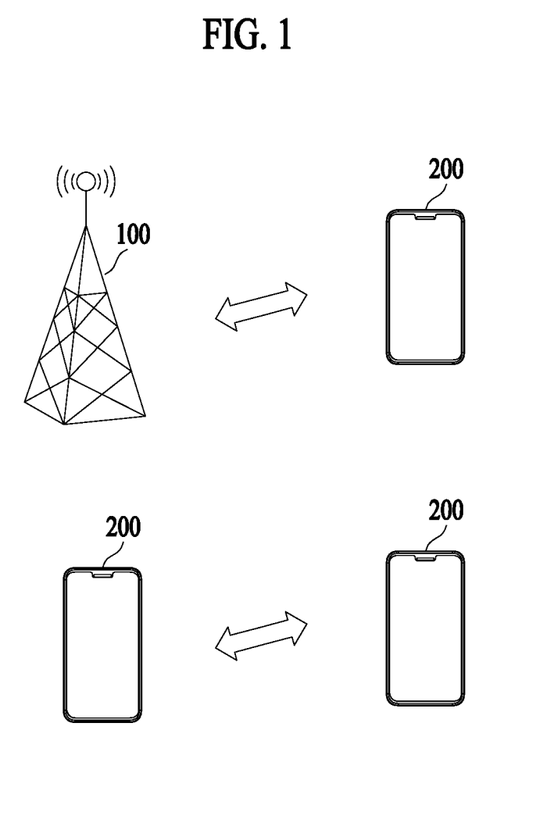
FIG. 1 is a diagram illustrating a signal transmission system for implementing an operation method of an electronic apparatus for transmitting a signal according to various example embodiments.

FIG. 1 is a diagram illustrating a signal transmission system for implementing an operation method of an electronic apparatus for transmitting a signal according to various example embodiments.

Referring to FIG. 1, a signal transmission system according to various example embodiments may be implemented by various types of electronic apparatuses. For example, the signal transmission system may be implemented in a communication node represented by a cell 100 or a communication node represented by a transmitter or a receiver such as a user device 200. Here, the communication node represented by the cell 100 or the user device 200 may be one or a portion of communication nodes of any type for providing or using a communication service, such as user equipment, a base station, a transmission and reception point (TRP), or a network node. That is, the signal transmission system of FIG. 1 may be implemented by various communication nodes. In the present disclosure, a communication node described as an entity of the signal transmission system may be a concept including any type of communication node corresponding to a transmitter or receiver to use or provide a communication service.

According to the present disclosure, in the signal transmission system of FIG. 1, the communication node represented by the cell 100 or the user device 200 may perform an operation between the cell 100 and the user device 200 or between the user devices 200 according to various example embodiments of the present disclosure. Meanwhile, the signal transmission system according to various example embodiments is not limited as shown in FIG. 1 and may be implemented in other various electronic apparatuses and servers.

The communication node represented by the cell 100 according to various example embodiments may perform wired and wireless communication with the communication node represented by the cell 100 or the user device 200 and may be an apparatus including a storage with a large capacity. In addition, other electronic apparatuses performing similar functions may be used as the communication node represented by the cell 100.

The communication node represented by the user device 200 according to various example embodiments may perform wired and wireless communication with the communication node represented by the cell 100 or the user device 200 and may be an apparatus including a storage with a predetermined capacity. Also, the communication node represented by the user device 200 may be an apparatus to be used by individual users, such as a desktop personal computer (PC), a tablet PC, a mobile terminal, and the like. In addition, other electronic apparatuses performing similar functions may be used as the communication node represented by the user device 200.

The signal transmission system according to various example embodiments may include various operation modules. The modules included in the signal transmission system may be computer code or one or more instructions that are implemented such that a physical apparatus (e.g., the communication node including the cell 100 or the user device 200) implementing the signal transmission system (or included in the physical apparatus) performs an operation assigned thereto. In other words, in the physical apparatus implementing the signal transmission system, a plurality of modules may be stored in a memory in the form of computer code. The plurality of modules stored in the memory, when executed by a computer, may be configured such that the physical apparatus performs assigned operations corresponding to the plurality of modules.

Alternatively, the signal transmission system according to various example embodiments may be implemented by a non-transitory computer-readable storage medium (or non-transitory computer-readable recording medium) for its operation. The operation method for transmitting a signal may be implemented through a software module or algorithm and may be stored on a computer-readable recording medium as computer-readable codes or program instructions executable on a processor. Here, the computer-readable recording medium may include a magnetic storage medium (e.g., read-only memory (ROM), random-access memory (RAM), floppy disk, hard disk, etc.) an optical reading medium (e.g., CD-ROM, digital versatile disc (DVD), etc.), and the like. The computer-readable recording medium may be distributed among computer systems connected through a network, so that the computer-readable code may be stored and executed in a distributed manner. The medium may be read by a computer, stored in a memory, and executed by a processor.

Figure 2:
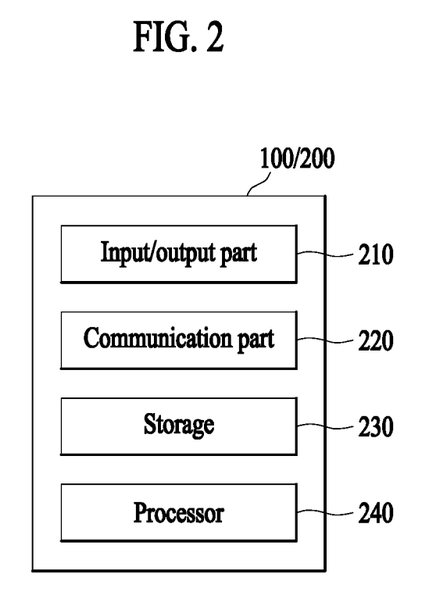
FIG. 2 is a block diagram illustrating a configuration of a communication node according to various example embodiments.

FIG. 2 is a block diagram illustrating a configuration of a communication node according to various example embodiments.

Referring to FIG. 2, a communication node represented by a transmitter or receiver such as the cell 100 or the user device 200 may include an input/output part 210, a communication part 220, a storage 230, and a processor 240.

The input/output part 210 may be various interfaces, various connection ports, or the like that receive a user input or output information to the user. The input/output part 210 may include an input module and an output module. The input module receives a user input from a user. The user input may have various forms of inputs including key inputs, touch inputs, and voice inputs. Examples of the input module that receives the user input may include a traditional form of keypad or keyboard, a mouse, as well as a touch sensor that senses a user's touch, a microphone that receives an audio signal, a camera that recognizes a gesture or the like through image recognition, a proximity sensor that includes at least one of an illumination sensor or an infrared sensor that senses approaching of the user, a motion sensor that recognizes a user's action through an acceleration sensor or a gyro sensor, and various forms of input parts that sense or input various forms of user input, and the input module according to an example embodiment of the present disclosure may include at least one of the above-listed devices.

Here, the touch sensor may be implemented with a piezoelectric or capacitive touch sensor that senses a touch via a touch panel or a touch film attached to a display panel, an optical touch sensor that senses a touch by an optical method, or the like. Besides, the input module may be implemented in the form of an input interface (USB port, PS/2 port, or the like) connecting an external input device to which user input is received, instead of a device that senses user input by itself. Further, the output module may output various kinds of pieces of information.

The output module may include at least one of a display for outputting an image, a speaker for outputting a sound, a haptic device for generating a vibration, and other various forms of output parts. In addition, the output module may also be implemented in the form of an output interface of the port type connecting the aforementioned individual output parts.

As an example, an output module in the form of a display may display a text, a still image, and a moving image. The display may include at least one of a liquid crystal display (LCD), a light emitting diode (LED) display, an organic light emitting diode (OLED) display, a flat panel display (FPD), a transparent display, a curved display, a flexible display, a three-dimensional display, a holographic display, a projector and other types of apparatus capable of performing image output functions. Such a display may have in the form of a touch display that is configured integrally with the touch sensor of the input module.

The communication part 220 may communicate with another apparatus. Thus, the communication node (e.g., the cell 100 or the user device 200) may transmit or receive information to and from another apparatus via the communication part 220. For example, the communication node (e.g., the cell 100 or the user device 200) may perform mutual communication or perform communication with another apparatus using the communication part 220.

Here, communication, namely, transmission and reception of data, may be performed in a wired or wireless manner. To this end, the communication part may include a wired communication module connected to the Internet or the like via a local region network (LAN), a mobile communication module connected to a mobile communication network via a mobile communication base station to transmit and receive data, a near field communication module using a wireless local area network (WLAN)-series communication scheme such as wireless fidelity (Wi-Fi), or a wireless personal area network (WPAN)-series communication scheme such as Bluetooth or Zigbee, a satellite communication module using a global navigation satellite system (GNSS) such as a global positioning system, or a combination thereof.

The storage 230 may store various pieces of information. The storage 230 may store data temporarily or semi-permanently. For example, an operating system (OS) for driving the communication node (e.g., the cell 100 or the user device 200), data for hosting a website, data about a program or application (for example, a web application) for generating braille, or the like may be stored in the storage 230 of the communication node (e.g., the cell 100 or the user device 200). Furthermore, the storage 230 may store modules in the form of computer code as described above.

The storage 230 may include, for example, a hard disk (HDD), a solid state drive (SSD), a flash memory, a ROM, a RAM, and the like. Such a storage may be provided in a built-in type or a detachable type.

The processor 240 controls the overall operation of the communication node (e.g., the cell 100 or the user device 200). To this end, the processor 240 may perform computation and processing of various information and control operation of constituent elements of the communication node (e.g., the cell 100 or the user device 200). For example, the processor 240 may execute programs or applications for signal transmission. The processor 240 may be implemented with a computer or a device similar thereto depending on hardware, software, or a combination thereof. The processor 240 may be implemented in the form of an electronic circuit that processes electrical signals to perform control functions in hardware, and may be implemented in the form of a program that drives the hardware processor 240 in software.

Meanwhile, it may be interpreted that the operation of the communication node (e.g., the cell 100 or the user device 200) is performed under the control of the processor 240, unless particularly other stated in the following description. That is, modules implemented in the signal transmission system described above, when executed, may be interpreted as the processor 240 controlling the communication node (e.g., the cell 100 or the user device 200) to perform the following operations.

In summary, example embodiments may be implemented in various ways. For example, the example embodiments may be implemented by hardware, firmware, software, a combination thereof, or the like.

In the case of implementation by hardware, a method according to various example embodiments may be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers, micro-processors, or the like.

In the case of implementation by firmware or software, a method according to various example embodiments may be implemented in the form of modules, procedures or functions that perform functions or operations to be described below. For example, the software codes may be stored in a memory and driven by a processor. The memory may be located inside or outside the processor, and may transmit or receive data to or from the processor by various devices already known.

Example embodiments will be described in more detail below based on the technical ideas described above. The above-described contents may be applied to various example embodiments to be described below. For example, operations, functions, terms, or the like that are not defined in the various example embodiments to be described below may be performed and described based on the contents described above.

Figure 3:
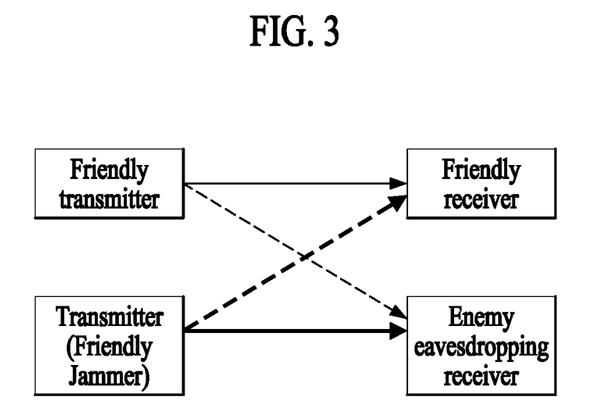
FIG. 3 is a diagram illustrating an existing physical layer security using a jamming signal.

FIG. 3 is a diagram illustrating an existing physical layer security using a jamming signal.

Referring to FIG. 3, it is assumed that an enemy's eavesdropping receiver is receiving a transmission signal from a friendly transmitter while the friendly transmitter and receiver communicate with each other. In this instance, to prevent the enemy's eavesdropping receiver from eavesdropping on friendly signals, a friendly jammer transmitter may be provided to transmit a jamming signal to the enemy's eavesdropping receiver as indicated by a bold arrow. In this case, since the enemy's eavesdropping receiver receives the transmission signal from the friendly transmitter and the jamming signal from the friendly jammer transmitter together, it is difficult to receive the signal from the friendly transmitter correctly. However, the jamming signal of the friendly jammer transmitter may also be partially received by the friendly receiver, and thus unintended consequences of interference caused by the jamming signal may occur even when the friendly receiver receives the transmission signal from the friendly transmitter. To minimize such unintended consequences, the friendly transmitter and jammer transmitter may be equipped with an antenna system capable of beam-shaping, so that each transmitter may shape an antenna beam toward a target for signal transmission. That is, the friendly transmitter may shape a transmission antenna beam toward a location of the friendly receiver to minimize signal transmission to the enemy's eavesdropping receiver, and likewise, the friendly jammer transmitter may shape a beam toward a location of the enemy's eavesdropping receiver to minimize the transmission of the jamming signal to the friendly receiver, and eavesdropping may be prevented while the unintended consequences are reduced.

The existing physical layer security system of FIG. 3 may have an effect of preventing signal reception by the enemy's eavesdropping receiver, but there are some issues with a complexity of the system, such as the requirement for a separate friendly jammer transmitter and the need for antennas capable of shaping beams toward a target of the friendly transmitter and jammer transmitter.

Figure 4:
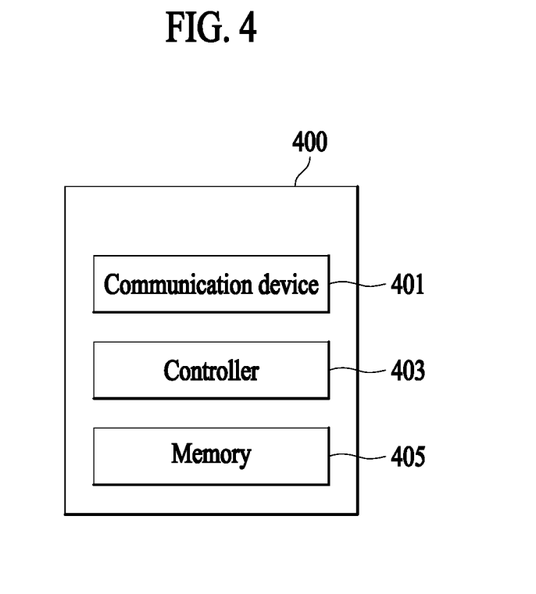
FIG. 4 is a block diagram illustrating an electronic apparatus for performing a signal transmission method.
Figure 5:
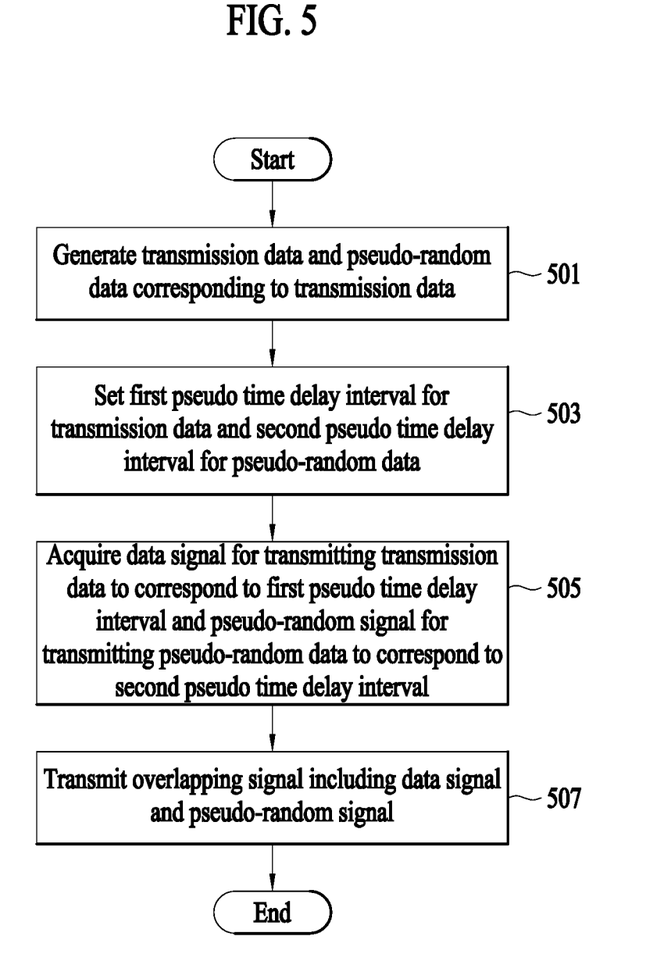
FIG. 5 is a flowchart illustrating an operation method of an electronic apparatus for transmitting a signal.

To solve the above issues, a method of protecting a friendly communication signal using a pseudo-random signal instead of using a separate friendly jammer transmitter and beam-shaping antenna may be presented as a method of FIG. 5 operable by an electronic apparatus of FIG. 4.

FIG. 4 is a block diagram illustrating an electronic apparatus for performing a signal transmission method.

Referring to FIG. 4, an electronic apparatus 400 performing a signal transmission method may include a communication device 401, a controller 403, and a memory 405. The constituent elements of the electronic apparatus 400 of FIG. 4 may correspond to the configuration of the communication node of FIG. 2, or the electronic apparatus 400 of FIG. 4 may include the configuration of the communication node of FIG. 2. For example, the communication device 401 included in the electronic apparatus 400 may correspond to the communication part 220 of FIG. 2, and transmit and receive a signal to and from an external device.

The electronic apparatus 400 of FIG. 4 may be connected to the cell 100 or another electronic device, for example, the user device 200 through the communication device 401, and based on the connection, may transmit and receive a signal to and from the cell 100 or the other user device 200 (e.g., electronic device).

The controller 403 may control the electronic apparatus 400 to perform a signal transmission method according to various example embodiments as described below with reference to FIGS. 5 through 9. For example, the controller 403 may control the electronic apparatus 400 to perform operations 501 through 507 of FIG. 5 and may control the electronic apparatus 400 to transmit, receive, and store various pieces of information utilized to perform operations 501 through 507 of FIG. 5.

The memory 405 may be a volatile memory or a non-volatile memory and program code utilized to execute a program for the controller 403 to perform the signal transmission method may be stored in the memory 405.

The electronic apparatus 400 performing the signal transmission method in the present disclosure is not limited to the configuration of FIG. 4, and in addition to the elements shown in FIG. 4, other general-purpose components may be included in the electronic apparatus 400 of the present disclosure.

FIG. 5 is a flowchart illustrating an operation method of an electronic apparatus for transmitting a signal.

Referring to FIG. 5, an electronic apparatus may generate transmission data and pseudo-random data corresponding to the transmission data in operation 501 and set a first pseudo time delay interval for the transmission data and a second pseudo time delay interval for the pseudo-random data in operation 503.

After that, the electronic apparatus may process and acquire a data signal for transmitting the transmission data to correspond to the first pseudo time delay interval and a pseudo-random signal for transmitting the pseudo-random data to correspond to the second pseudo time delay interval in operation 505, and transmit an overlapping signal including the data signal and the pseudo-random signal to another electronic apparatus in operation 507.

According to various example embodiments, in operation 501, the electronic apparatus may generate transmission data and pseudo-random data corresponding to the transmission data.

For example, the transmission data generated by the electronic apparatus according to operation 501 may be channel-coded and modulated to be acquired as the data signal and transmitted by the electronic apparatus. Also, the pseudo-random data generated by the electronic apparatus according to operation 501 may be modulated to be acquired as the pseudo-random signal and transmitted by the electronic apparatus. In this instance, the electronic apparatus may simultaneously generate the data signal and the pseudo-random signal, overlap the data signal and the pseudo-random signal, and transmit the data signal and the pseudo-random signal as an overlapping signal. A receiver receiving the overlapping signal may correct reception synchronization using a preamble included in the overlapping signal, perform channel estimation, and remove the pseudo-random signal from the overlapping signal, thereby correctly receiving the data signal.

For example, the pseudo-random data generated by the electronic apparatus according to operation 501 may be data transmitted and received between the electronic apparatus and the receiver based on a random data generating method shared between the electronic apparatus and the receiver in advance. When the electronic apparatus corresponding to a transmitter generates the pseudo-random data based on the random data generating method shared in advance and transmits the pseudo-random data and the transmission data to the receiver as the overlapping signal, the receiver may remove the pseudo-random signal from the overlapping signal based on a pseudo-random reception signal generated using the pseudo-random data according to the random data generating method shared in advance and receive the data signal, thereby acquiring the transmission data.

Figure 6:
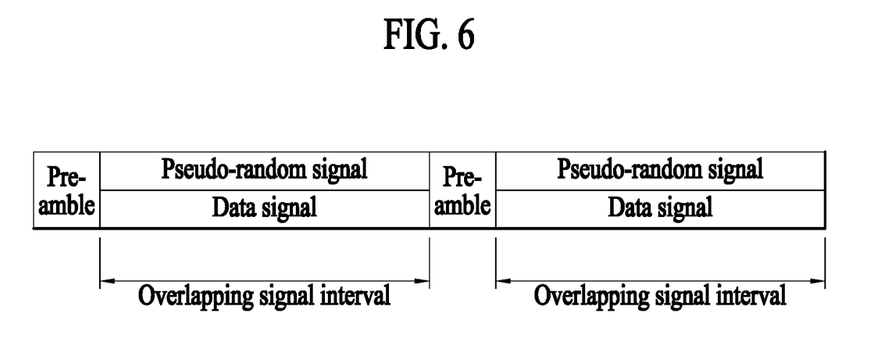
FIG. 6 is a diagram illustrating a physical layer security to which an overlap between a data signal and a pseudo-random signal is applied.

A physical layer security in which the data signal and the pseudo-random signal are overlapped may be shown in FIG. 6.

FIG. 6 is a diagram illustrating a physical layer security to which an overlap between a data signal and a pseudo-random signal is applied.

Referring to FIG. 6, an electronic apparatus may transmit an overlapping signal including a data signal and a pseudo-random signal in a predetermined overlapping signal interval as described above, and in this instance, the pseudo-random signal included in the overlapping signal transmitted by the electronic apparatus may include pseudo-random data generated based on a random data generating method shared between the electronic apparatus and a receiver in advance.

As illustrated in FIG. 6, the overlapping signal transmitted by the electronic apparatus may be identified and received by the receiver through a preamble corresponding to the overlapping signal. The receiver identifying the overlapping signal through the preamble may remove the pseudo-random signal from the received overlapping signal based on a pseudo-random reception signal generated using the pseudo-random data according to the random data generating method shared in advance, receive the data signal, and acquire the transmission data.

In this instance, when the electronic apparatus overlaps and transmits the transmission data and the pseudo-random data to enhance the physical layer security, to obtain more effective physical layer security performance, the electronic apparatus may set a pseudo time delay interval for the transmission data and the pseudo-random data and transmit the data signal and the pseudo-random signal based on the set pseudo time delay interval. The physical layer security in which the data signal and the pseudo-random signal are overlapped with adding and setting a pseudo time delay may be shown in FIG. 7.

Figure 7:
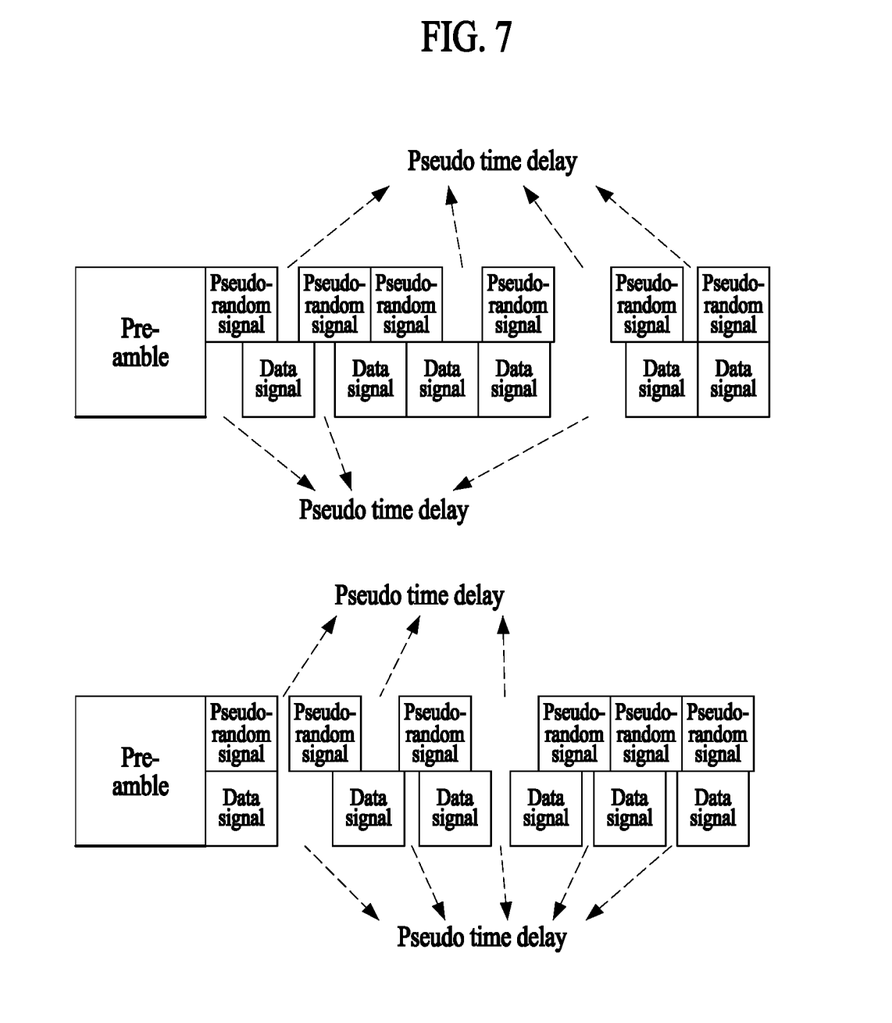
FIG. 7 is a diagram illustrating a physical layer security for which a pseudo time delay is set and an overlap between a data signal and a pseudo-random signal is applied.

FIG. 7 is a diagram illustrating a physical layer security for which a pseudo time delay is set and an overlap between a data signal and a pseudo-random signal is applied.

Referring to FIG. 7, an electronic apparatus may transmit an overlapping signal including a data signal and a pseudo-random signal in a predetermined overlapping signal interval similar to the example embodiments described with reference to FIG. 6. In this instance, the data signal and the pseudo-random signal transmitted by the electronic apparatus may be set to be transmitted in remaining time intervals other than the pseudo time delay interval in the overlapping signal interval instead of being transmitted in a pseudo time delay interval set for each of the signals. The pseudo time delay interval set for each of the data signal and the pseudo-random signal may include one or more time intervals. The pseudo time delay intervals may be arbitrarily set for the data signal and the pseudo-random signal.

If an arbitrary time delay interval is inserted in the transmission of the data signal and the pseudo-random signal, an interval in which the two signals are actually overlapped in the overlapping signal interval may continuously or periodically change over time, and as a result, a waveform of the overlapping signal may change in various forms over time. In this case, an enemy's eavesdropping receiver may be difficult to receive the data signal correctly.

In this instance, an operation of the electronic apparatus setting the pseudo time delay intervals for the transmission data and the pseudo-random data according to various example embodiments as illustrated in FIG. 7 may be performed as in operation 503.

According to various example embodiments, in operation 503, the electronic apparatus may set the first pseudo time delay interval for the transmission data and the second pseudo time delay interval for the pseudo-random data.

For example, the first pseudo time delay interval set for the transmission data by the electronic apparatus according to operation 503 may include one or more time intervals in which the transmission data is not to be transmitted in a signal transmission time interval for transmitting the overlapping signal obtained by overlapping the data signal including the transmission data and the pseudo-random signal including the pseudo-random data. In addition, the second pseudo time delay interval set for the pseudo-random data by the electronic apparatus according to operation 503 may include one or more time intervals in which the pseudo-random data is not to be transmitted in the signal transmission time interval for transmitting the overlapping signal.

Accordingly, in the signal transmission interval in which the data signal including the transmission data and the pseudo-random signal including the pseudo-random data are overlapped and transmitted, the data signal may be transmitted based on a remaining time interval other than the first pseudo time delay interval in the signal transmission time interval, and the pseudo-random signal may be transmitted based on a remaining time interval other than the second pseudo time delay interval in the signal transmission time interval.

For example, operation 503 in which the electronic apparatus sets the first pseudo time delay interval and the second pseudo time delay interval may include an operation of acquiring first information including information on the first pseudo time delay interval to indicate the first pseudo time delay interval and second information including information on the second pseudo time delay interval to indicate the second pseudo time delay interval and setting the first pseudo time delay interval and the second pseudo time delay interval based on the acquired first information and second information. In other words, operation 503 of the electronic apparatus may be performed based on a case in which the electronic apparatus acquires indication information associated with the pseudo time delay interval.

When a transmitter corresponding to the electronic apparatus overlaps the data signal including the transmission data and the pseudo-random signal including the pseudo-random data and transmits the overlapping signal to the receiver, each of the transmitter and the receiver may include a device for setting each pseudo time delay interval corresponding to each of the signals and perform an operation of setting the corresponding pseudo time delay interval based on the device. The transmitter transmitting the overlapping signal in which the data signal including the transmission data overlaps the pseudo-random signal including the pseudo-random data and the receiver receiving the overlapping signal in the example of FIG. 8 may each further include a pseudo time delay-related device to transmit and receive an overlapping signal for which the pseudo time delay interval is inserted as described with reference to FIG. 9.

Figure 8:
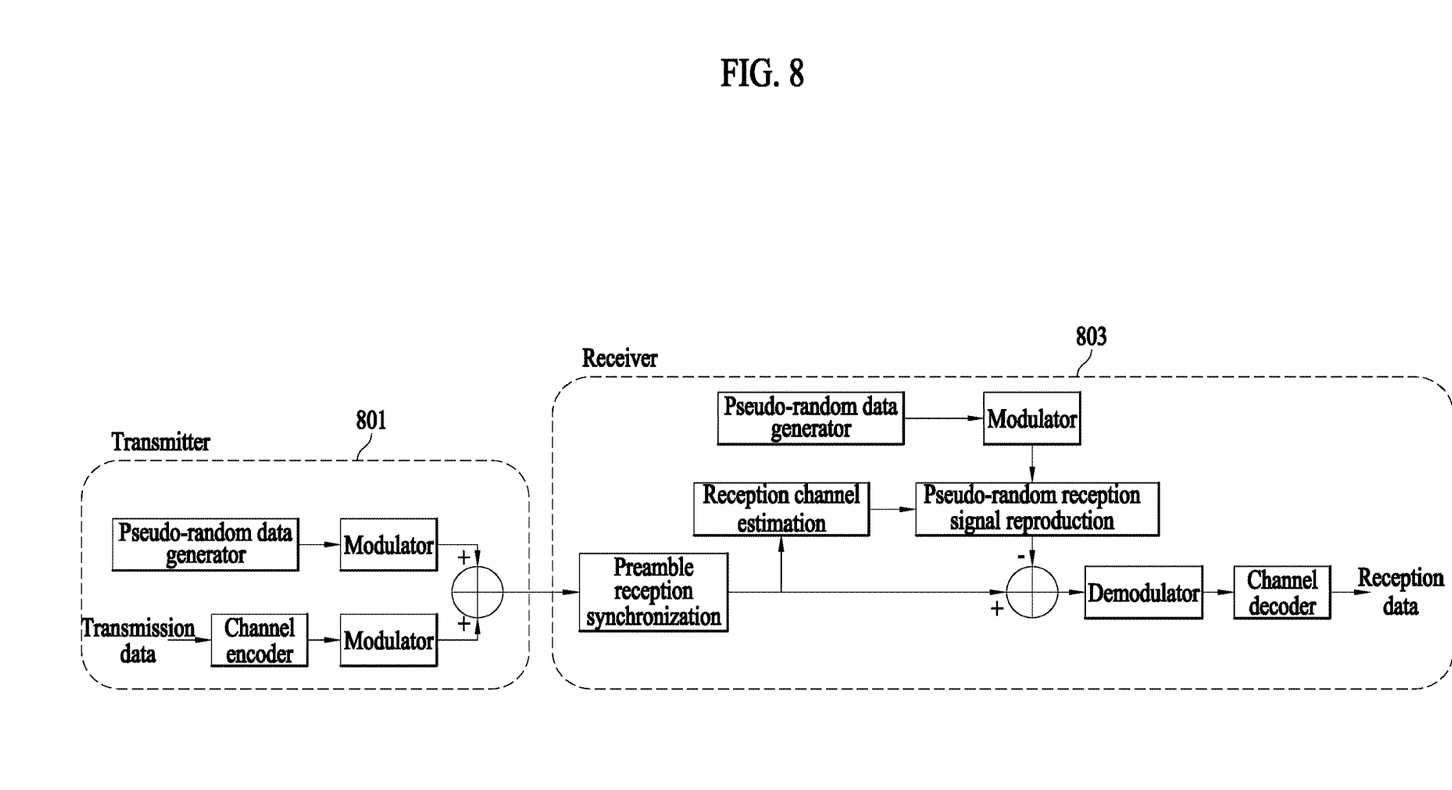
FIG. 8 is a functional block diagram illustrating a transmitter and a receiver transmitting and receiving an overlapping signal including a data signal and a pseudo-random signal.

FIG. 8 is a functional block diagram illustrating a transmitter and a receiver transmitting and receiving an overlapping signal including a data signal and a pseudo-random signal.

As indicated by reference numeral 801 of FIG. 8, a transmitter may generate transmission data and pseudo-random data, acquire a data signal by performing channel-coding and modulation processing on the transmission data, acquire a pseudo-random signal by performing modulation processing on the pseudo-random data, and transmit an overlapping signal obtained by overlapping the acquired signals to a receiver. The receiver receiving the overlapping signal may identify the overlapping signal through a preamble of the overlapping signal and correct synchronization for receiving the overlapping signal. In this instance, the receiver may remove the pseudo-random signal to correspond to a reception channel based on a random data generating method agreed in advance for the pseudo-random data, and then perform demodulation and channel-decoding and acquire data transmitted by the transmitter as reception data as indicated by reference numeral 803.

Figure 9:
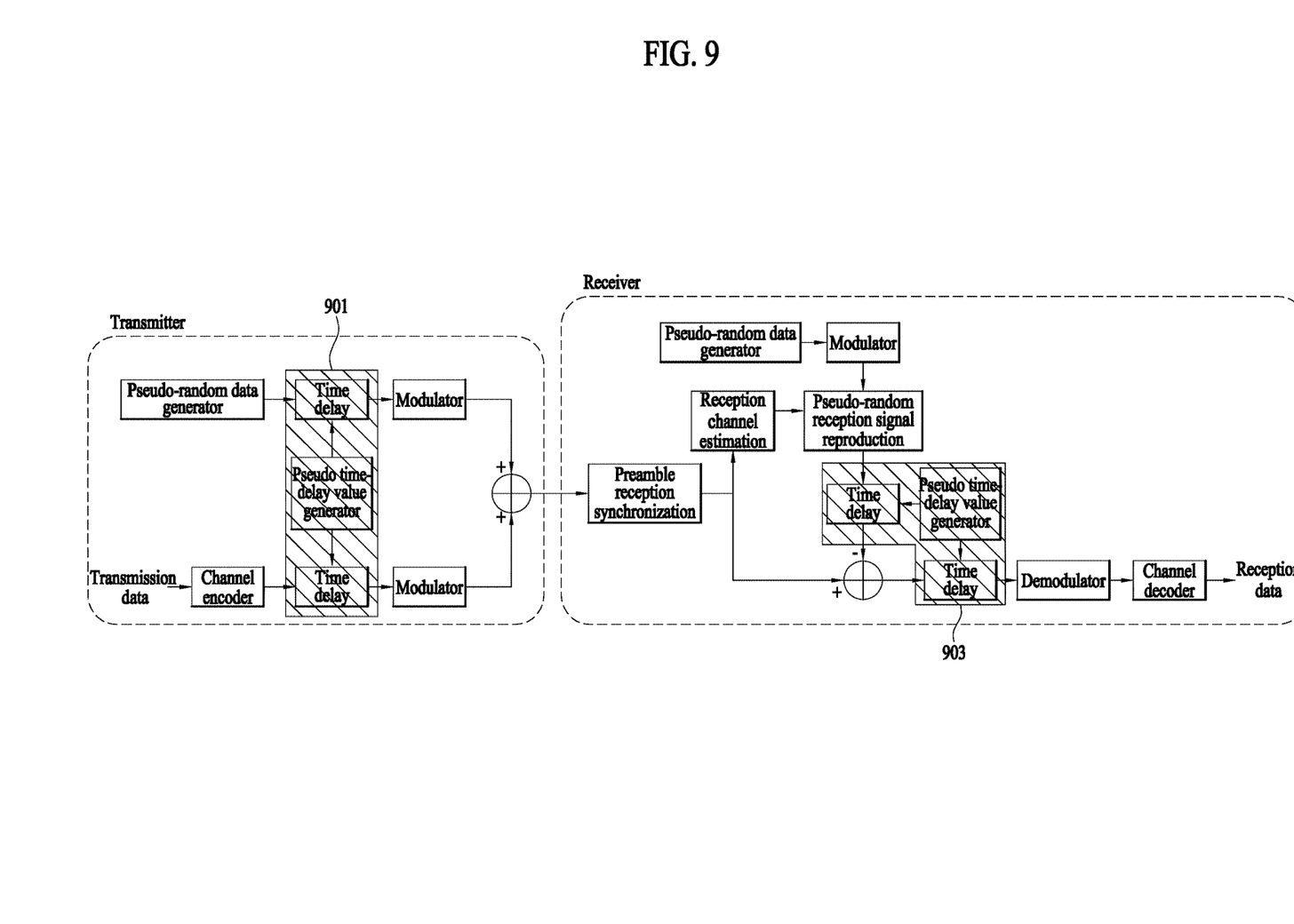
FIG. 9 is a functional block diagram illustrating a transmitter and receiver transmitting and receiving an overlapping signal including a data signal and a pseudo-random signal based on processing for a pseudo time delay.

If the transmitter and the receiver are to process the data signal and the pseudo-random signal with pseudo time delays inserted in the transmission and reception of the signals, a functional block diagram of the transmitter and the receiver may be represented as shown in FIG. 9.

FIG. 9 is a functional block diagram illustrating a transmitter and receiver transmitting and receiving an overlapping signal including a data signal and a pseudo-random signal based on processing for a pseudo time delay.

Referring to FIG. 9, a transmitter may include a pseudo time delay generator to additionally insert a pseudo time delay in a process of transmitting an overlapping signal as indicated by the reference numeral 801 of FIG. 8. As indicated by reference numeral 901, the transmitter may process a data signal and a pseudo-random signal to have pseudo time delays for generated transmission data and pseudo-random data and transmit an overlapping signal in which the signals are overlapped to a receiver. Likewise, the receiver receiving the overlapping signal may include a pseudo time delay generator to correct the pseudo time delay inserted for each of the signals in a process of receiving the overlapping signal as indicated by the reference numeral 803 of FIG. 8, and based on this, may acquire data transmitted by the transmitter as reception data as indicated by reference numeral 903 of FIG. 9.

The pseudo time delay generators included in the transmitter and the receiver of FIG. 9 may independently generate values, positions, and the number of times of arbitrary time delays to be assigned to the data signal and the pseudo-random signal, which may be shared or agreed upon between the transmitter and the receiver. In this instance, pseudo time delay values generated in the transmitter and the receiver are identical. Thus, the receiver may identify a pseudo time delay interval for the pseudo-random signal included in the signal received by the receiver to remove the pseudo-random signal in an accurate time interval, and likewise, may identify a pseudo time delay interval for the data signal to acquire data in an accurate time interval.

The pseudo time delay generators included in the transmitter and the receiver of FIG. 9 may correspond to devices for generating setting information for indicating the pseudo time delay intervals for the data signal and the pseudo-random signal. Here, the setting information for indicating the pseudo time delay intervals may be understood as corresponding to the first information acquired to correspond to the first pseudo time delay interval for the data signal and the second information acquired to correspond to the second pseudo time delay interval for the pseudo-random signal by the electronic apparatus in operation 503.

More specifically, the first information including the information on the first pseudo time delay interval may include one or more pieces of indication information including a symbol and an offset for indicating one or more time intervals included in the first pseudo time delay interval. In this instance, the one or more pieces of indication information included in the first information may include first indication information including a first symbol and a first offset for indicating a first time interval included in the one or more time intervals constituting the first pseudo time delay interval. The first indication information may indicate a time interval that starts at a point in time of the first symbol and is indicated as a duration corresponding to the first offset.

In addition, the second information including the information on the second pseudo time delay interval may include one or more pieces of indication information including a symbol and an offset for indicating one or more time intervals included in the second pseudo time delay interval. Likewise, the one or more pieces of indication information included in the second information may include second indication information including a second symbol and a second offset for indicating a second time interval included in the one or more time intervals constituting the second pseudo time delay interval. The second indication information may indicate a time interval that starts at a point in time of the second symbol and is indicated as a duration corresponding to the second offset.

For example, the first information acquired by the electronic apparatus to correspond to the first pseudo time delay interval for the data signal may be configured and managed as information corresponding to the transmission data to be transmitted by the electronic apparatus. Also, the second information acquired to correspond to the second pseudo time delay interval for the pseudo-random signal may be configured and managed as information corresponding to the pseudo-random data generated for the transmission data by the electronic apparatus. In addition, the first information and the second information may be configured and managed as specific information in the electronic apparatus.

For example, the first pseudo time delay interval and the second pseudo time delay interval set by the electronic apparatus according to operation 503 may be time intervals updated and set in cycles of a frame including the signal transmission time interval for transmitting the overlapping signal including the data signal and the pseudo-random signal.

That is, the pseudo time delay interval may be updated and set for each frame to correspond to the transmission data, and the pseudo time delay interval may be updated and set for each frame to correspond to the pseudo-random data.

According to various example embodiments, in operation 505, the electronic apparatus may process and acquire the data signal for transmitting the transmission data to correspond to the first pseudo time delay interval and the pseudo-random signal for transmitting the pseudo-random data to correspond to the second pseudo time delay interval.

For example, as shown in FIG. 9, the data signal and the pseudo-random signal acquired by the electronic apparatus according to operation 505 may correspond to a signal for which channel-coding for the transmission data, insertion of a pseudo time delay, and modulation processing are performed and a signal for which insertion of a pseudo time delay for the pseudo-random data and modulation processing are performed, respectively.

According to various example embodiments, in operation 507, the electronic apparatus may transmit the overlapping signal including the data signal and the pseudo-random signal.

For example, the overlapping signal transmitted by the electronic apparatus according to operation 507 may include the data signal and the pseudo-random signal acquired according to various example embodiments described above.

In the signal transmission method of the present disclosure, the data signal and the pseudo-random signal may be overlapped to allow the pseudo-random signal to perform a function of noise so as to prevent an enemy's eavesdropping receiver from receiving the data signal. Further, if arbitrary time delays are added for the data signal and the pseudo-random signal at arbitrary temporal positions, it may be difficult for the enemy's eavesdropping receiver to identify timings of the data signal and the pseudo-random signal, which may enhance an eavesdropping prevention effect on the data signal.

The example embodiments of the present disclosure disclosed in the present specification and the figures are merely specific examples disclosed to easily explain the technical content of the present disclosure and further facilitate overall understanding of the present disclosure, and are not intended to limit the scope of the present disclosure. That is, it will be apparent to those skilled in the art that other variations based on the technical ideas of the present disclosure may be made. In addition, the respective example embodiments described above may be implemented in combination with each other as necessary. For example, all example embodiments of the present disclosure may be implemented by a system in combination with parts.

Furthermore, the method executed by the system or the like according to the present disclosure may be implemented in the form of program instructions, which may be carried out through various computer devices, and recorded on a computer-readable medium.

As described above, various example embodiments of the present disclosure may be implemented with computer-readable codes in a computer-readable recording medium from a specific point of view. The computer-readable recording medium is any data storage device capable of storing data that may be read by a computer system. Examples of the computer-readable recording medium may include a read-only memory (ROM), a random access memory (RAM), compact-disk read-only memories (CD-ROMs), magnetic tapes, floppy disks, optical data storage devices, and carrier waves (such as data transmission over the Internet). Further, the computer readable recording medium may be distributed through network-connected computer systems. Thus, the computer-readable codes are stored and executed in a distributed manner. In addition, functional programs, codes, and code segments for implementing various example embodiments of the present disclosure may be easily interpreted by those skilled in a field to which the present disclosure is applied.

Further, it will be appreciated that apparatuses and methods according to various example embodiments of the present disclosure are implemented in the form of hardware, software, or a combination of hardware and software. Such software may be stored in a volatile or non-volatile storage device such as a storage device such as a ROM, or a memory such as a RAM, a memory chip, a device or an integrated circuit, or, for example, an optically or magnetically recordable storage medium or a machine (for example, a computer)-readable storage medium, such as a compact disk (CD), a digital versatile disc (DVD), a magnetic disk, or a magnetic tape, regardless of a removable or rewritable function. It will be appreciated that the method according to various example embodiments of the present disclosure may be implemented by a computer including a controller and a memory, a vehicle including such a memory or computer, or the like. The memory is an example of a storage medium that is readable by a machine suitable for storing a program or programs including instructions for implementing example embodiments of the present disclosure or storing programs.

Accordingly, the present disclosure encompasses a program including codes for implementing an apparatus or method defined in the claims of the present specification and a machine (a computer, or the like)-readable storage medium that stores such a program. In addition, such a program may be electronically transmitted through any medium such as a communication signal that is delivered in a wired or wireless connection, and the present disclosure may suitably encompass things equivalent to the same.

It will be apparent to those skilled in the art that various modifications and variations can be made in the embodiments without departing from the spirit or scope of the invention. Thus, it is intended that the present invention cover the modifications and variations of this invention provided they come within the scope of the appended claims and their equivalents.

What is claimed is:

1. A method of transmitting a signal by an electronic apparatus, the method comprising:
    generating transmission data and pseudo-random data corresponding to the transmission data;
    setting a first pseudo time delay interval for the transmission data and a second pseudo time delay interval for the pseudo-random data;
    acquiring a data signal for transmitting the transmission data to correspond to the first pseudo time delay interval and a pseudo-random signal for transmitting the pseudo-random data to correspond to the second pseudo time delay interval; and
    transmitting an overlapping signal including the data signal and the pseudo-random signal.

2. The method of claim 1, wherein the first pseudo time delay interval includes one or more time intervals in which the transmission data is not to be transmitted in a signal transmission time interval for transmitting the overlapping signal, and
    the second pseudo time delay interval includes one or more time intervals in which the pseudo-random data is not to be transmitted in the signal transmission time interval.

3. The method of claim 2, wherein the data signal is transmitted based on a remaining time interval other than the first pseudo time delay interval in the signal transmission time interval,
    the pseudo-random signal is transmitted based on a remaining time interval other than the second pseudo time delay interval in the signal transmission time interval, and
    the data signal and the pseudo-random signal overlap in the signal transmission time interval.

4. The method of claim 1, wherein the setting of the first pseudo time delay interval and the second pseudo time delay interval comprises:
    acquiring first information including information on the first pseudo time delay interval and second information including information on the second pseudo time delay interval; and
    setting the first pseudo time delay interval and the second pseudo time delay interval based on the first information and the second information.

5. The method of claim 4, wherein the first information includes one or more pieces of indication information including a symbol and an offset for indicating one or more time intervals included in the first pseudo time delay interval, and
    the one or more pieces of indication information include first indication information including a first symbol and a first offset for indicating a first time interval included in the one or more time intervals.

6. The method of claim 4, wherein the second information includes one or more pieces of indication information including a symbol and an offset for indicating one or more time intervals included in the second pseudo time delay interval, and
    the one or more pieces of indication information include second indication information including a second symbol and a second offset for indicating a second time interval included in the one or more time intervals.

7. The method of claim 4, wherein the first information is configured to correspond to the transmission data,
    the second information is configured to correspond to the pseudo-random data, and
    the first information and the second information are configured to correspond to the electronic apparatus.

8. The method of claim 1, wherein the first pseudo time delay interval and the second pseudo time delay interval are updated and set in cycles of a frame including a signal transmission time interval for transmitting the overlapping signal.

9. An electronic apparatus for transmitting a signal, the electronic apparatus comprising:
    a processor; and
    a memory storing a program for execution by the processor, the program including instructions for:
    generating transmission data and pseudo-random data corresponding to the transmission data;
    setting a first pseudo time delay interval for the transmission data and a second pseudo time delay interval for the pseudo-random data;
    acquiring a data signal for transmitting the transmission data to correspond to the first pseudo time delay interval and a pseudo-random signal for transmitting the pseudo-random data to correspond to the second pseudo time delay interval; and
    transmitting an overlapping signal including the data signal and the pseudo-random signal.

10. The electronic apparatus of claim 9, wherein the first pseudo time delay interval includes one or more time intervals in which the transmission data is not to be transmitted in a signal transmission time interval for transmitting the overlapping signal, and
    the second pseudo time delay interval includes one or more time intervals in which the pseudo-random data is not to be transmitted in the signal transmission time interval.

11. The electronic apparatus of claim 10, wherein the data signal is transmitted based on a remaining time interval other than the first pseudo time delay interval in the signal transmission time interval, the pseudo-random signal is transmitted based on a remaining time interval other than the second pseudo time delay interval in the signal transmission time interval, and the data signal and the pseudo-random signal overlap in the signal transmission time interval.

12. The electronic apparatus of claim 9, wherein the setting of the first pseudo time delay interval and the second pseudo time delay interval comprises:

acquiring first information including information on the first pseudo time delay interval and second information including information on the second pseudo time delay interval; and setting the first pseudo time delay interval and the second pseudo time delay interval based on the first information and the second information.

13. The electronic apparatus of claim 12, wherein the first information includes one or more pieces of indication information including a symbol and an offset for indicating one or more time intervals included in the first pseudo time delay interval, and the one or more pieces of indication information include first indication information including a first symbol and a first offset for indicating a first time interval included in the one or more time intervals.

14. The electronic apparatus of claim 12, wherein the second information includes one or more pieces of indication information including a symbol and an offset for indicating one or more time intervals included in the second pseudo time delay interval, and the one or more pieces of indication information include second indication information including a second symbol and a second offset for indicating a second time interval included in the one or more time intervals.

15. The electronic apparatus of claim 12, wherein the first information is configured to correspond to the transmission data, the second information is configured to correspond to the pseudo-random data, and the first information and the second information are configured to correspond to the electronic apparatus.

16. The electronic apparatus of claim 9, wherein the first pseudo time delay interval and the second pseudo time delay interval are updated and set in cycles of a frame including a signal transmission time interval for transmitting the overlapping signal.

17. A non-transitory computer readable storage medium storing a program configured to be executed by a processor, the program comprising instructions for:

generating transmission data and pseudo-random data corresponding to the transmission data;

setting a first pseudo time delay interval for the transmission data and a second pseudo time delay interval for the pseudo-random data;

acquiring a data signal for transmitting the transmission data to correspond to the first pseudo time delay interval and a pseudo-random signal for transmitting the pseudo-random data to correspond to the second pseudo time delay interval; and transmitting an overlapping signal including the data signal and the pseudo-random signal.

18. The non-transitory computer readable storage medium of claim 17, wherein the first pseudo time delay interval includes one or more time intervals in which the transmission data is not to be transmitted in a signal transmission time interval for transmitting the overlapping signal, and the second pseudo time delay interval includes one or more time intervals in which the pseudo-random data is not to be transmitted in the signal transmission time interval.

19. The non-transitory computer readable storage medium of claim 18, wherein the data signal is transmitted based on a remaining time interval other than the first pseudo time delay interval in the signal transmission time interval, the pseudo-random signal is transmitted based on a remaining time interval other than the second pseudo time delay interval in the signal transmission time interval, and the data signal and the pseudo-random signal overlap in the signal transmission time interval.

20. The non-transitory computer readable storage medium of claim 18, wherein the setting of the first pseudo time delay interval and the second pseudo time delay interval comprises:

acquiring first information including information on the first pseudo time delay interval and second information including information on the second pseudo time delay interval; and setting the first pseudo time delay interval and the second pseudo time delay interval based on the first information and the second information.

* * * * *